United States Patent [19]

Foster

[11] Patent Number: 4,505,730
[45] Date of Patent: Mar. 19, 1985

[54] METHOD OF COOLING A MOULD

[75] Inventor: Thomas V. Foster, Cantley, England

[73] Assignee: Emhart Industries, Inc., Farmington, Conn.

[21] Appl. No.: 433,123

[22] PCT Filed: Feb. 22, 1982

[86] PCT No.: PCT/GB82/00057
§ 371 Date: Sep. 30, 1982
§ 102(e) Date: Sep. 30, 1982

[87] PCT Pub. No.: WO82/02883
PCT Pub. Date: Sep. 2, 1982

[30] Foreign Application Priority Data
Feb. 27, 1981 [GB] United Kingdom ............... 8106259

[51] Int. Cl.³ .................................................. C03B 9/38
[52] U.S. Cl. ..................................... 65/162; 65/265; 65/355
[58] Field of Search ............... 65/265, 162, 161, 319, 65/355, 357, 359

[56] References Cited

U.S. PATENT DOCUMENTS

| | | | |
|---|---|---|---|
| 3,133,807 | 5/1964 | Denman et al. | 65/356 |
| 3,586,491 | 6/1971 | Mennitt | 65/265 |
| 3,666,433 | 5/1972 | Nebelung et al. | 65/158 |
| 3,888,647 | 6/1975 | Breeden et al. | 65/319 |
| 4,067,711 | 1/1978 | Jones | 65/319 |
| 4,070,174 | 1/1978 | Nebelung et al. | 65/355 |
| 4,101,306 | 7/1978 | Schaar | 65/359 |
| 4,137,061 | 1/1979 | Mallory et al. | 65/232 |
| 4,361,434 | 11/1982 | Schneider | 65/319 |
| 4,388,099 | 6/1983 | Hermening et al. | 65/357 |

FOREIGN PATENT DOCUMENTS 1491859 11/1974 United Kingdom .

Primary Examiner—William Smith
Assistant Examiner—Michael K. Boyer
Attorney, Agent, or Firm—Arthur B. Moore

[57] ABSTRACT

A method of cooling a mould in a glassware forming machine wherein an intermediate support (26) supports a mould portion (10) and defines a space (36) which serves to insulate a movable support (14) of mould opening and closing mechanism of the machine from the mould portion (10). The mould portion (10) is cooled by blowing air into the space (36). The air blown into the space (36) increases the insulating effect of the space (36) and also can be blown through an aperture (40) in the intermediate support (26) on to the mould portion (10) so as to cool that portion of the mould portion (10).

7 Claims, 1 Drawing Figure

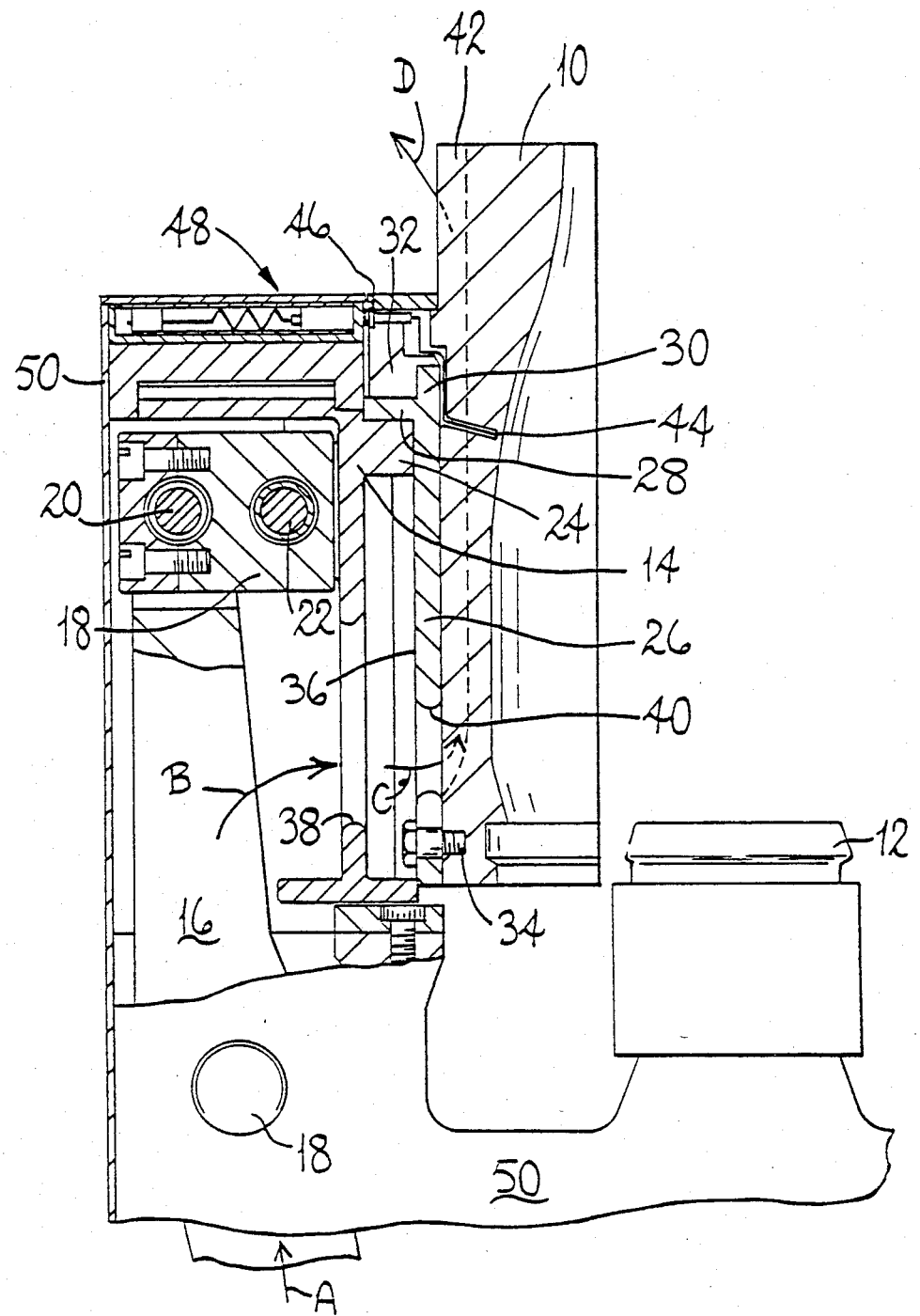

4,505,730

METHOD OF COOLING A MOULD

TECHNICAL FIELD

This invention is concerned with a method of cooling a mould in a glassware forming machine wherein at least one portion of the mould is supported on a movable support which is moved to bring the mould portion supported thereby into engagement with other mould portions to form a closed mould or out of engagement with the other mould portions to open the mould.

The invention is also concerned with a mould arrangement of a glassware forming machine comprising a mould opening and closing mechanism operable to move at least one portion of the mould into engagement with other mould portions to form a closed mould or out of engagement with the other mould portions to open the mould, the mechanism comprising a mould portion support arranged to support the mould portion, and moving means operable to move the mould portion support to move the mould portion as aforesaid.

BACKGROUND ART

The moulds used in the manufacture of glassware articles require to be cooled during manufacture so as to avoid the moulds becoming overheated due to heat received from the glass. In the event that the moulds do become overheated, the glass may stick to the mould and satisfactory articles of glassware will not be produced.

There are various known methods of cooling moulds in glassware forming machines. In some of these methods cooling air is blown over the outside of the mould and in others the cooling air is passed through passages in the mould. In these methods while the mould may be satisfactorily cooled the cooling means does not insulate the mould from the mould opening and closing mechanism which may therefore become overheated. In other cooling methods, the mould is surrounded by a chamber into which cooling air is passed. This method insulates the mould opening and closing mechanism from the mould but requires the provision of very complicated mould supports which are only practical for certain types of mould.

DISCLOSURE OF INVENTION

In a method of cooling a mould in accordance with the invention, the mould portion is supported by an intermediate support which is removably supported on the movable support and defines a space which serves to insulate the movable support from the mould portion, and the mould portion is cooled by blowing air into the space.

In a mould arrangement in accordance with the invention, an intermediate support is removably mounted on the mould support, the intermediate support supporting the mould portion and defining a space which serves to insulate the mould support from the mould portion, and a passage through the mould support, provides access to the space so that cooling air can be blown into the space.

In order to enable the mould portion to be cooled to a greater extent in certain areas thereof, the intermediate support has at least one aperture therein through which cooling air, blown into the space defined by the intermediate support, passes to impinge on the mould portion.

In order to increase the cooling effect on the mould portion, the cooling air blown through the aperture in the intermediate support passes between fins on the outer surface of the mould portion.

In order to provide greater control of the cooling process, the quantity of cooling air blown into the space is controlled in accordance with the reading of a thermocouple embedded in the mould portion.

BRIEF DESCRIPTION OF DRAWING

The accompanying drawing is a side elevational view, partially in section, of a portion of a mould arrangement of a glassware forming machine in accordance with the invention.

BEST MODE OF CARRYING OUT THE INVENTION

The mould arrangement shown in the drawing is positioned at the blow station of an individual section glassware forming machine. The mould arrangement comprises a mould portion 10 which forms a side portion of a completed mould for making a glass bottle. The completed mould also comprises a further mould portion similar to the portion 10 (not shown) and a bottom portion 12. The mould arrangement also comprises a mould opening and closing mechanism operable to move the mould portion 10 into engagement with the other mould portions to form a closed mould or out of engagement with the other mould portions to open the mould.

The mould opening and closing mechanism comprises a mould portion support 14 which is arranged to support the mould portion 10, and moving means operable to move the mould portion support 14 to move the mould portion 10 as aforesaid. The moving means comprises a piston and cylinder assembly (not shown) which is operable to cause a lever 16 to pivot about a pivot pin 17 thereof. The lever 16 is secured at an upper end thereof to a block 18. The block 18 being connected to the lever 16 by a pivot pin 20. The block 18 is also connected to the support 14 by means of a pivot pin 22 which enters side portions of the support 14 which extend on each side of the block 18 (the side portions of the support 14 are not visible in the drawing).

The mould support 14 has a lateral projection 24 which is T-shaped in plan view (not shown) and on to which an intermediate support 26 is removably mounted with the projection 24 received in a T-shaped slot (not shown) in the support 26. The projection 24 is a loose fit in the T-shaped slot to allow the support 26 to move slightly sideways relative to the support 14. A portion 28 of the support 26 projects over the projection 24 to support the support 26 on the support 14. The intermediate support 26 has an upstanding lip portion 30 over which a hook portion 32 of the mould portion 10 fits so that the mould portion 10 is mounted on the support 26 and hence on the support 14. A bolt 34 also interconnects the intermediate portion 26 and the mould portion 10. The intermediate support 26 defines a space 36 between itself and the mould portion support 14. This space 36 serves to insulate the mould support 14 from the mould portion 10. The insulating effect of the space 36 reduces the possibility of overheating of the support 14 due to heat from the hot glass in the mould.

The glassware forming machine of which the mould arrangement forms part comprises blowing means located beneath the mould arrangement operable to blow mould cooling air past the lever 16 in the direction of the arrow A in the drawing this air as indicated by the arrow B passes through a passage 38 formed in the mould support 14. This passage 38 provides access to the space 36 so that the cooling air can be blown into the space 36. The cooling air received in the space 36 increases the insulating effect of the space 36.

The intermediate support 26 also has at least one aperture 40 therein through which the cooling air blown into the space 36 leaves the space 36, as indicated by the arrow C, This air passes through the aperture 40 and impinges on the mould portion 10, thereby cooling the portion of the mould portion 10 which is aligned with the aperture 40 to a greater extent than the remainder of the mould portion 10 is cooled. The air passing through the aperture 40 passes upwardly between fins 42 of the mould portion 10 and eventually escapes to atmosphere as indicated by the arrow D. As the cooling air passes between the fins 42 on the outer surface of the mould portion 10 the cooling effect on the mould portion 10 is increased.

A thermocouple 44 is embedded in the mould portion 10 and is connected to electrical contact members 46 which, when the mould portion is in its open position (shown in the drawing), make contact with an electrical contact device 48 which is fixedly mounted on a framework 50 of the machine. When the contacts 46 make contact with the device 48, the electrical signal of the thermocouple 44 is read and the cooling means is adjusted in accordance with the reading of the thermocouple 44 to control the quantity of cooling air blown into the space 36.

The mould portion 10 can readily be removed from the mould arrangement merely by lifting the mould portion 10 vertically away from the projection 24, the intermediate support 26 being removed with the mould portion 10. The intermediate support 26 may readily be replaced with another such support having its aperture 40 differently located so that a different cooling arrangement can be achieved.

What is claimed is:

1. In a mold apparatus of a glassware forming machine including a mold opening and closing mechanism operable to move at least one movable mold portion of the mold into engagement with other mold portions to form a closed mold or out of engagement with the other mold portions to open the mold, said mechanism having a movable mold portion support to which the movable mold portion is mounted, an improved movable mold portion support comprising:

a movable mold portion holder; and an intermediate support holder which supports the movable mold portion and is mountably attached to the mold portion holder by means of a slot in the intermediate support member and a mating projection in the mold portion holder, said mating projection being loosely confined within said slot, wherein said intermediate support member and movable mold portion holder define a space therebetween to thermally insulate the movable mold portion holder from the movable mold portion, and said movable portion holder defines a passage providing access to said space to permit flow of cooling air into said space.

2. The mold apparatus according to claim 1 whrein the intermediate support member has at least one aperture through which cooling air, blown into the space defined by the intermediate support member, passes to impinge on the movable mold portion.

3. The mold apparatus according to claim 2 wherein the aperture includes an entrance at a lower region of the movable mold portion, and an exit at an upper region of said movable mold portion.

4. The mold apparatus according to claim 2 wherein the movable mold portion has fins on its outer surface and the cooling air passes through said aperture between said fins.

5. The mold apparatus according to claim 4 further including means for controlling the quantity of cooling air, said controlling means including a thermocouple embedded in the movable mold portion.

6. In a mold apparatus of a glassware forming machine including a mold opening and closing mechanism operable to move at least one movable mold portion of the mold into engagement with other mold portions to form a closed mold or out of engagement with the other mold portions to open the mold, said mechanism having a movable mold portion support to which the movable mold portion is mounted, an improved movable mold portion support comprising:

a movable mold portion holder; and an intermediate support member which supports the movable mold portion and is demountably and loosely attached to the movable mold portion holder, said intermediate support member and said movable mold portion holder defining an air space therebetween to thermally insulate the mold portion holder from said movable mold portion, and said movable mold portion holder defining a passage providing access to said space to permit the flow of cooling air into said space.

wherein the intermediate support member has at least one aperture therein with an entrance at a lower region of the movable mold portion into which cooling air passes from the space, to impinge upon the movable mold portion, and exit near an upper region of the movable mold portion.

7. The mold apparatus according to claim 6 wherein the movable mold portion has fins on its outer surface and the cooling air passes through said aperture between said fins.

* * * * *